United States Patent
Krishnan et al.

(10) Patent No.: US 7,940,487 B1
(45) Date of Patent: May 10, 2011

(54) HEATING A HEAD DISK ASSEMBLY FOR A TIME INTERVAL PRIOR TO WRITING SPIRAL SERVO TRACKS TO THE DISK

(75) Inventors: Puspanathan Krishnan, Klang (MY); Anandan Vengadasalam, Batu Claves (MY); Hilmy Ahmad@Mohamad, Petaling Jaya (MY)

(73) Assignee: Western Digital Technologies, Inc., Irvine, CA (US)

( * ) Notice: Subject to any disclaimer, the term of this patent is extended or adjusted under 35 U.S.C. 154(b) by 380 days.

(21) Appl. No.: 12/145,457

(22) Filed: Jun. 24, 2008

(51) Int. Cl.
*G11B 5/02* (2006.01)
(52) U.S. Cl. ....................................................... 360/59
(58) Field of Classification Search ............ 360/59, 360/48, 75, 69, 135; 369/13.54, 44.23
See application file for complete search history.

(56) References Cited

U.S. PATENT DOCUMENTS

| | | | |
|---|---|---|---|
| 5,416,757 A * | 5/1995 | Luecke et al. ............. | 369/44.23 |
| 5,644,556 A * | 7/1997 | Oikawa ..................... | 369/13.54 |
| 5,774,313 A * | 6/1998 | Tanaka et al. ............. | 360/135 |
| 6,023,145 A | 2/2000 | Karaaslan et al. | |
| 6,229,304 B1 | 5/2001 | Guzik | |
| 6,483,300 B1 | 11/2002 | Severson et al. | |
| 6,819,637 B1 * | 11/2004 | Hasegawa et al. ......... | 369/44.23 |
| 6,977,789 B1 * | 12/2005 | Cloke ......................... | 360/75 |
| 6,992,851 B1 | 1/2006 | Cloke | |
| 6,992,852 B1 | 1/2006 | Ying et al. | |
| 7,145,744 B1 | 12/2006 | Clawson et al. | |
| 7,199,956 B1 * | 4/2007 | Moser et al. ............... | 360/46 |
| 7,253,985 B1 * | 8/2007 | Gami et al. ................ | 360/75 |
| 7,321,479 B2 * | 1/2008 | Kim et al. .................. | 360/75 |
| 7,330,327 B1 * | 2/2008 | Chue et al. ................. | 360/75 |
| 7,630,162 B2 * | 12/2009 | Zhao et al. ................. | 360/75 |
| 2006/0103967 A1 | 5/2006 | Kim et al. | |
| 2007/0223131 A1 * | 9/2007 | Sado et al. ................. | 360/75 |
| 2007/0291401 A1 * | 12/2007 | Sun et al. ................... | 360/75 |

\* cited by examiner

*Primary Examiner* — Fred Tzeng

(57) ABSTRACT

A method of writing spiral servo tracks to a disk of a disk drive is disclosed. The disk is heated by applying a heating power to a heater for a time interval. After the time interval, the heating power is reduced, and the spiral servo tracks are written to the disk. In one embodiment, an external spiral servo writer comprises a heat lamp for heating an exterior surface of a head disk assembly (HDA) prior to writing spiral servo tracks to the disk.

19 Claims, 6 Drawing Sheets

HEATING A HEAD DISK ASSEMBLY FOR A TIME INTERVAL PRIOR TO WRITING SPIRAL SERVO TRACKS TO THE DISK

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the velocity of the actuator arm as it seeks from track to track.

FIG. 1 shows a prior art disk format 4 as comprising a number of data tracks 6 defined by servo sectors $2_0$-$2_N$ recorded around the circumference of each data track. Each servo sector $2_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $2_i$ further comprises groups of servo bursts 14 (e.g., A, B, C and D bursts), which comprise a number of consecutive transitions recorded at precise intervals and offsets with respect to a data track centerline. The groups of servo bursts 14 provide fine head position information used for centerline tracking while accessing a data track during write/read operations.

A conventional technique for writing the servo sectors $2_0$-$2_N$ to the disk comprises writing a plurality of spiral servo tracks to the disk using an external spiral track servo writer, and then to servo off of the spiral servo tracks in order to write the servo sectors $2_0$-$2_N$. During the spiral servo track writing process, thermal expansion of disk drive components, such as the disk, head stack assembly, and spindle motor may cause unequal spacing of the spiral servo tracks resulting in radial position errors as well as phase errors when servo writing the product servo sectors $2_0$-$2_N$.

SUMMARY OF EMBODIMENT OF THE INVENTION

A method of writing spiral servo tracks to a disk of a disk drive is disclosed. The disk is heated by applying a heating power to a heater for a time interval. After the time interval, the heating power is reduced, and the spiral servo tracks are written to the disk.

DETAILED DESCRIPTION OF EMBODIMENTS OF THE INVENTION

Figure 1:
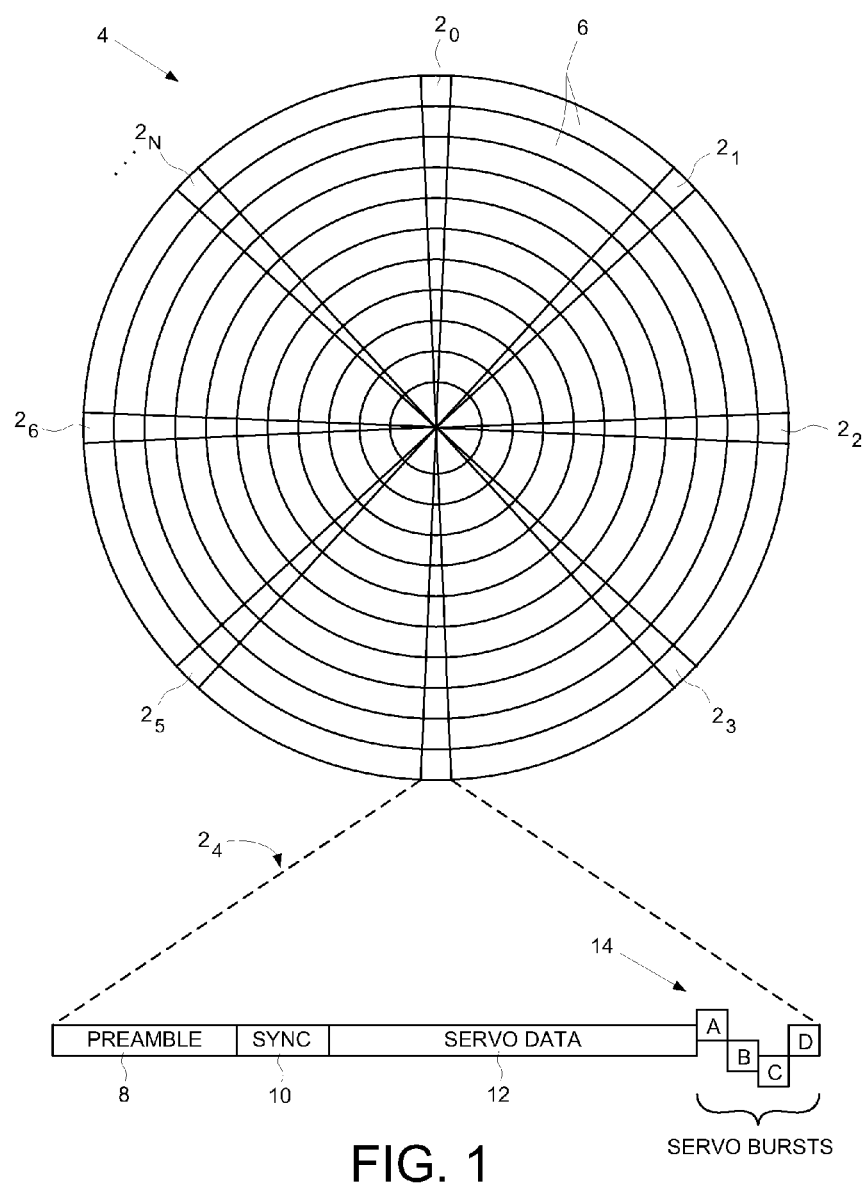
FIG. 1 shows a prior art disk format comprising a plurality of data tracks defined by a plurality of servo sectors.
Figure 2A:
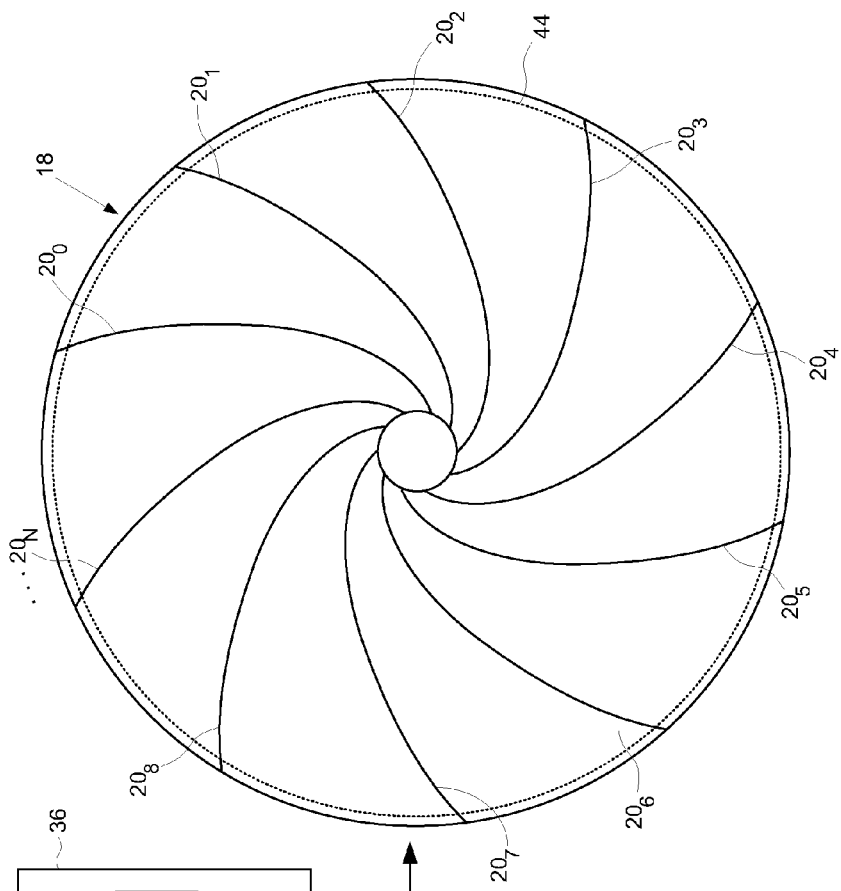
FIGS. 2A and 2B show an external spiral servo writer for writing spiral servo tracks to the disk of a disk drive.
Figure 6:
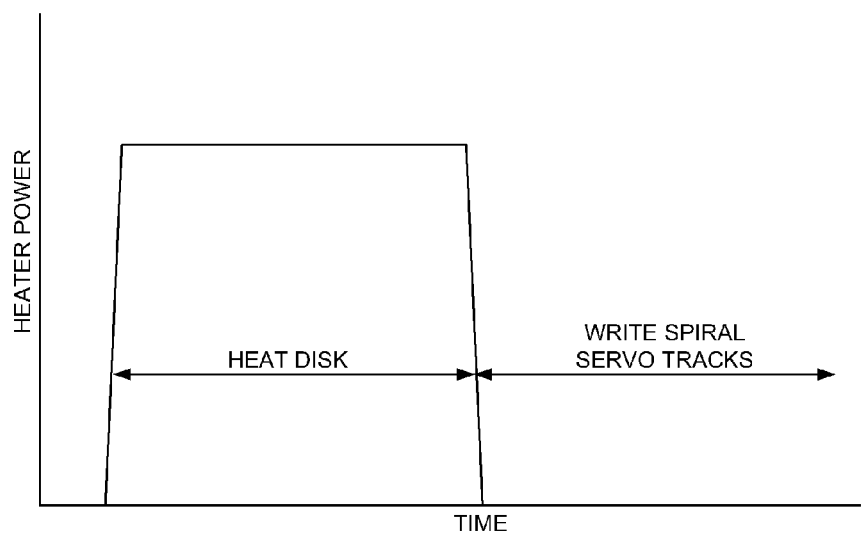
FIG. 6 shows an embodiment of the present invention wherein a heater power is set to a high setting for a time interval in order to quickly heat the disk prior to writing the spiral servo tracks.

FIG. 2A shows an apparatus 16 (an external spiral servo writer) for writing spiral servo tracks $18_0$-$18_N$ (FIG. 2B) to a disk 20 of a disk drive 22. The apparatus 16 comprises a heater 24 and control circuitry 26 operable to heat the disk 20 by applying a heating power to the heater 24 for a time interval (FIG. 6). After the time interval, the control circuitry 26 reduces the heating power and writes the spiral servo tracks $18_0$-$18_N$ to the disk 20.

In the embodiment of FIG. 2A, the disk drive 22 comprises a head disk assembly (HDA) 28 for housing the disk 20 and a head 30 coupled to a distal end of an actuator arm 32. A voice coil motor (VCM) 34 rotates the actuator arm 32 about a pivot in order to actuate the head 30 radially over the disk 20. Control circuitry 36 for controlling the operation of the disk drive 22 is mounted onto a printed circuit board (PCB) which is coupled to the HDA 28. In one embodiment, the external spiral servo writer 16 writes the spiral servo tracks $18_0$-$18_N$ to the disk 20 prior to coupling the PCB to the HDA 28.

Referring again to FIG. 2A, the external spiral servo writer 16 comprises a head positioner 38 for actuating a head positioning pin 40 using sensitive positioning circuitry, such as a laser interferometer. While the head positioner 38 moves the head 30 at a predetermined velocity over the stroke of the actuator arm 32, pattern circuitry 42 generates the data sequence written to the disk 20 for a spiral servo track 18. The external spiral servo writer 16 inserts a clock head 46 into the HDA 28 for writing a clock track 44 (FIG. 2B) at an outer diameter of the disk 20. The clock head 46 then reads the clock track 44 to generate a clock signal 48 processed by timing recovery circuitry 50 to synchronize a write clock 51 for writing the spiral servo tracks $18_0$-$18_N$ to the disk 20. The timing recovery circuitry 50 enables the pattern circuitry 42 at the appropriate time relative to the write clock 51 so that the spiral tracks $18_0$-$18_N$ are written at the appropriate circular location. The timing recovery circuitry 50 also enables the pattern circuitry 42 relative to the write clock 51 to write sync marks within the spiral tracks $18_0$-$18_N$ at the same circular location from the outer diameter to the inner diameter of the disk 20. The constant interval between sync marks (independent of the radial location of the head 30) enables a servo write clock to maintain synchronization while writing product servo sectors to the disk.

Figure 2B:
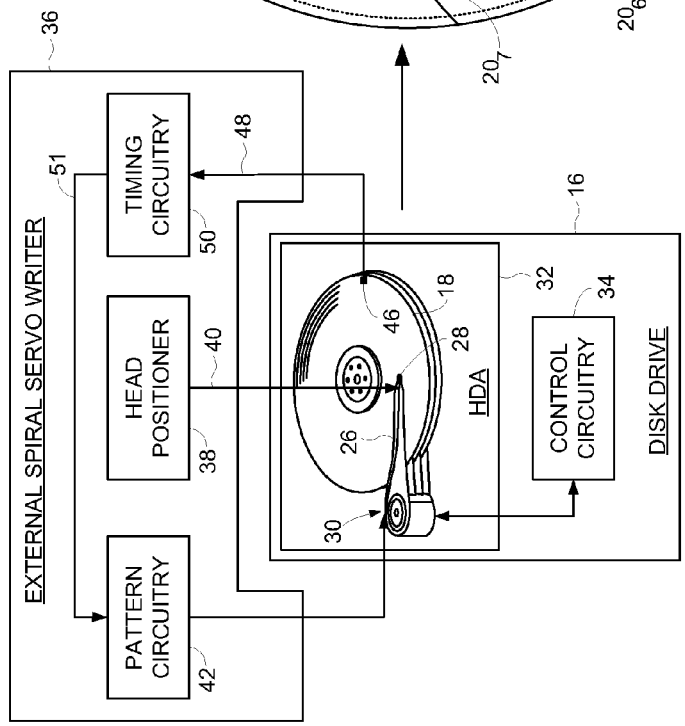
Figure 3:
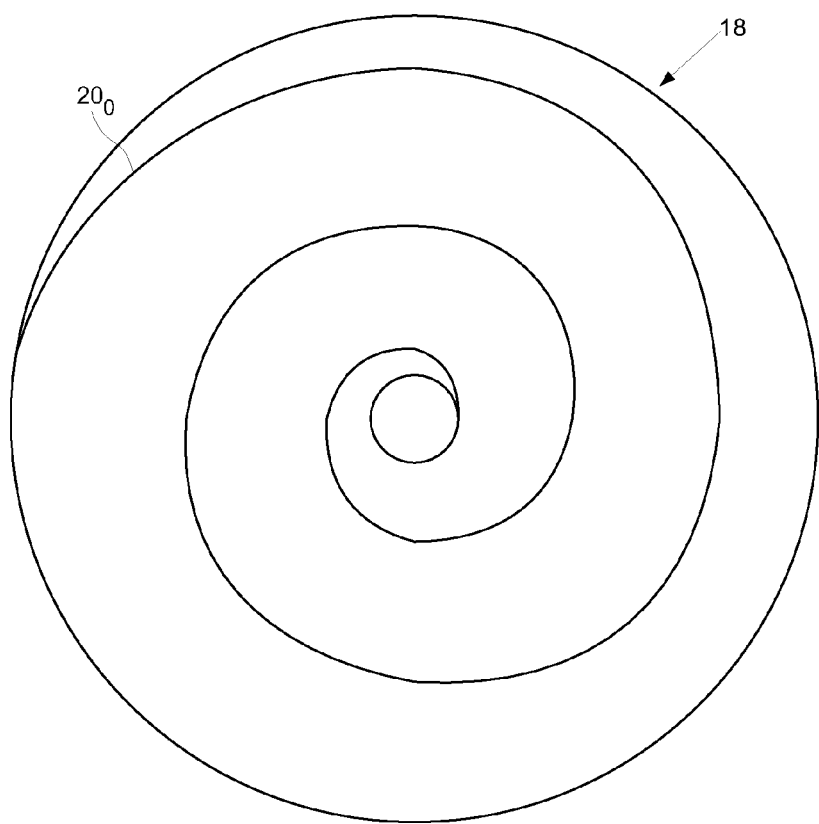
FIG. 3 shows that in one embodiment each spiral servo track is written over multiple revolutions of the disk.

In the embodiment of FIG. 2B, each spiral track $18_i$ is written over a partial revolution of the disk 20. In an alternative embodiment, each spiral track $18_i$ is written over one or more revolutions of the disk 20. FIG. 3 shows an embodiment wherein each spiral track $18_i$ is written over multiple revolutions of the disk 20.

In one embodiment, after the external spiral servo writer 16 writes the spiral tracks $18_0$-$18_N$ to the disk 20, the head positioning pin 40 and clock head 46 are removed from the HDA 28 and the product servo sectors are written to the disk 20 during a "fill operation". In one embodiment, the control circuitry 36 within the disk drive 22 is used to process the spiral tracks $18_0$-$18_N$ in order to write the product servo sectors to the disk 20. In an alternative embodiment, an external product servo writer is used to process the spiral tracks $18_0$-$18_N$ in order to write the product servo sectors to the disk 20.

Figure 4:
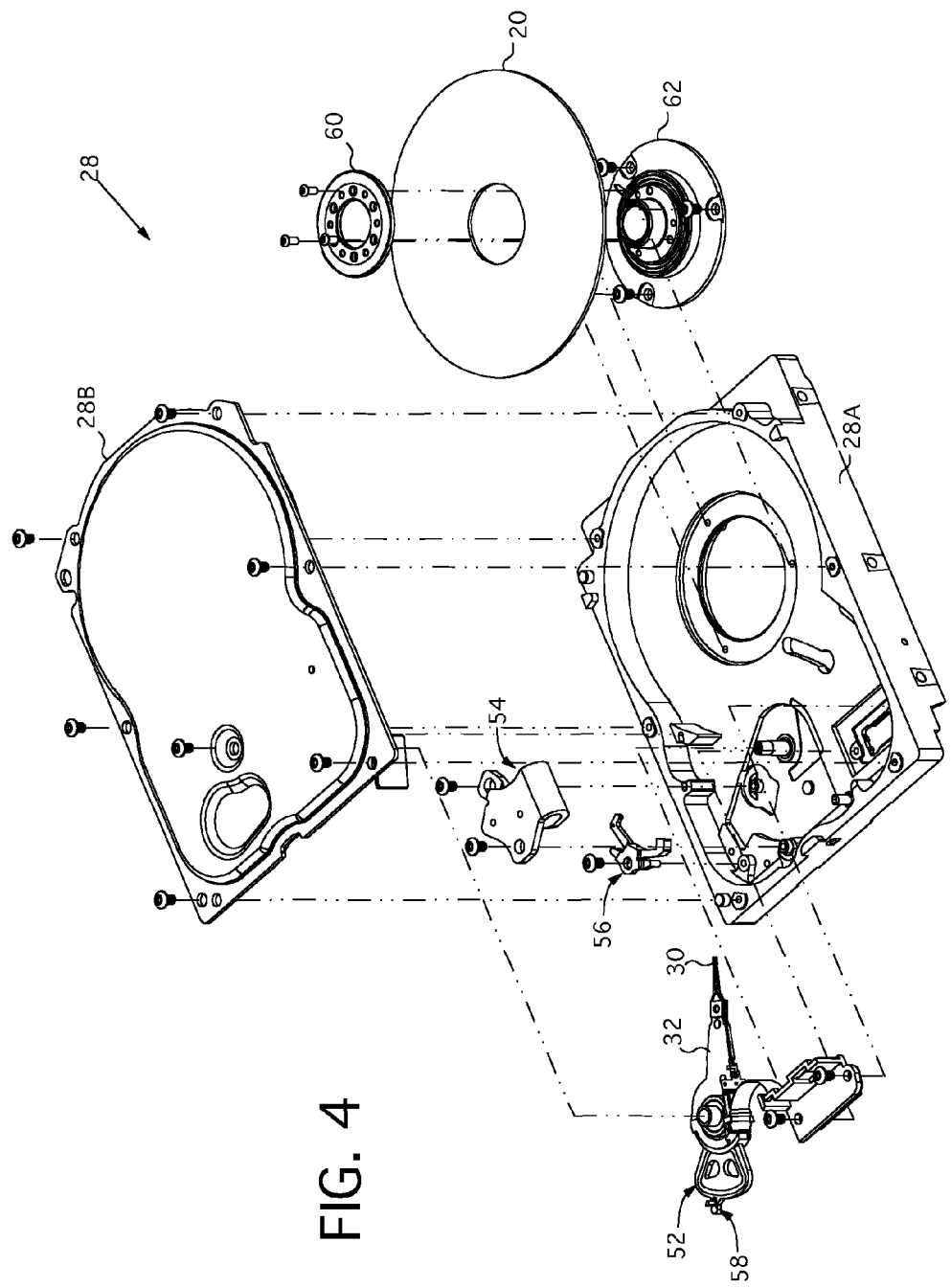
FIG. 4 shows an exploded view of a head disk assembly (HDA) for housing a disk, a head connected to a distal end of an actuator arm, and a voice coil motor for rotating the actuator arm about a pivot.

FIG. 4 shows an exploded view of an HDA for housing a head 30 connected to a distal end of an actuator arm 32, and a VCM for rotating the actuator arm 32 about a pivot. The VCM comprises a voice coil 52 coupled to a base of the actuator arm 32 and a yoke 54 comprising at least one permanent magnet (not shown). The HDA 28 further comprises a crash stop 56 which interacts with a tang 58 coupled to the base of the actuator arm 32 in order to limit the stroke of the actuator arm 32. One or more disks 20 are clamped 60 to a spindle motor 62 which rotates the disk(s) 20. The spindle motor 62 and actuator arm 32 are coupled to a base 28A of the HDA 28, and a cover 28B is attached to the base 28A to form the housing of the HDA 28.

Figure 5:
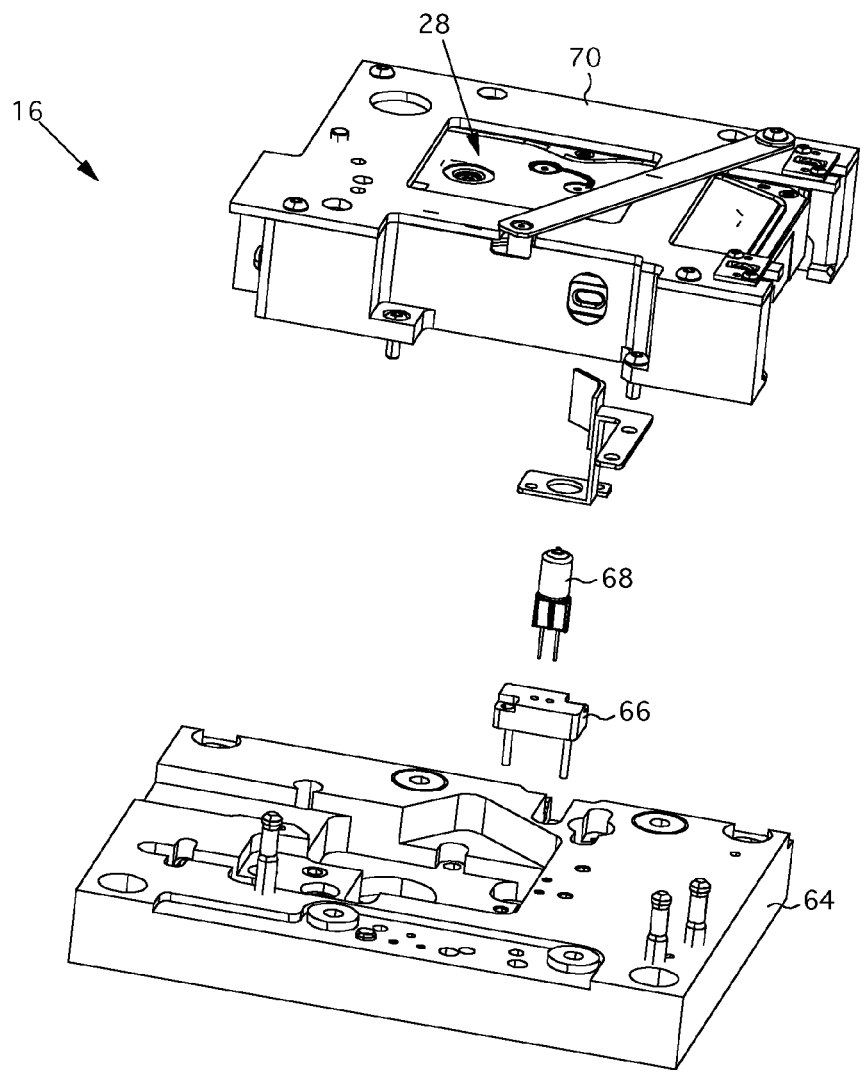
FIG. 5 is an exploded view of an external spiral servo writer including a halogen lamp for heating the disk prior to writing the spiral servo tracks according to an embodiment of the present invention.

FIG. 5 shows an exploded view of an external spiral servo writer 16 according to an embodiment of the present invention as comprising a base 64, a socket 66 for receiving a heat lamp 68 (e.g., a halogen lamp), and a nest 70 for receiving an HDA 28. The heat lamp 68 radiates energy in the form of light which heats an exterior surface of the HDA 28 thereby heating the internal components, including the head 30, the actuator arm 32, the VCM 34, the spindle motor 62, and the disk 20.

In one embodiment illustrated in FIG. 6, after inserting the HDA 28 into the nest 70, the control circuitry 26 of the external spiral servo writer 16 applies a heating power to the heat lamp 68 (e.g., applies a current) for a time interval. After the time interval, the control circuitry 26 reduces the heating power and then writes the spiral servo tracks $18_0$-$18_N$ to the disk 20. In this manner, the components within the HDA 28 thermally expand prior to the spiral servo writing process in order to minimize the write errors that would otherwise occur if thermal expansion occurs during the spiral servo writing process.

Any suitable heating interval may be employed in the embodiments of the present invention, and in one embodiment, the heating interval is selected so as to achieve a desired percentage of thermal expansion (e.g., 95%) of the HDA 28 components. In one embodiment, the heating interval is determined by evaluating a number of HDAs and then selecting a value that ensures the components will reach the desired percentage of thermal expansion.

In one embodiment, the heating interval is adjusted relative to a number of disks installed within the HDA 28, and in another embodiment, the heating interval is adjusted relative to a size of the disks installed in the HDA 28 (i.e., the form factor). In one embodiment, the heating interval is configured manually by a person operating the external spiral servo writer 16, and in another embodiment, the external spiral servo writer 16 comprises suitable circuitry (e.g., a bar code reader) for reading an identifier on the HDA 28 which indicates the number of disks and/or the form factor of the disks within the HDA 28. The control circuitry 26 within the external spiral servo writer 16 reads the identifier on the HDA 28 in order to automatically configure the heating interval.

In the embodiment of FIG. 6, the heating power is turned on for the heating interval and then turned off in a form of "bang-bang" control. In another embodiment, the heating power may be ramped up and down, and in yet another embodiment, the heating power may be turned down rather than turned off after the heating interval. In yet another embodiment, the external spiral servo writer 16 comprises a suitable temperature sensor for providing feedback in a closed loop control system. The temperature sensor may measure a surface temperature of the HDA 28, for example, at a predetermined location away from the heat lamp 68.

Any suitable heater 24 may be employed in the embodiments of the present invention, such as the heat lamp 68 shown in FIG. 5, or a heating coil which generates heat when driven with current. The heater 24 may radiate energy onto the surface of the HDA 28, or the heater 24 may heat the HDA 28 directly by contacting a surface of the HDA 28. Any suitable control circuitry 26 may also be employed in the embodiments of the present invention, such as a microprocessor executing the steps of a control program, and/or state machine circuitry. Certain aspects of the control circuitry 26 may also be activated manually by a user, such as an embodiment where a user inserts the HDA 28 into the nest 70 of the external spiral servo writer 16 which begins the heating interval shown in FIG. 6.

What is claimed is:

1. A method of writing spiral servo tracks to a disk of a disk drive, the method comprising:
   heating the disk by applying a heating power to a heater for a time interval;
   reducing the heating power after the time interval; and
   writing the spiral servo tracks to the disk after the time interval.

2. The method as recited in claim 1, wherein the heater comprises a lamp.

3. The method as recited in claim 2, wherein the lamp comprises a halogen lamp.

4. The method as recited in claim 3, wherein the halogen lamp comprises a reflector.

5. The method as recited in claim 1, wherein reducing the heating power comprises turning the heating power off.

6. The method as recited in claim 1, wherein heating the disk comprises heating a head disk assembly (HDA) housing the disk.

7. The method as recited in claim 6, wherein heating the disk comprises radiating energy onto an external surface of the HDA.

8. The method as recited in claim 6, further comprising adjusting the time interval based on a number of disks housed in the HDA.

9. The method as recited in claim 6, further comprising adjusting the time interval based on a size of the disk.

10. An apparatus for writing spiral servo tracks to a disk of a disk drive, the apparatus comprising:
    a heater; and
    control circuitry operable to:
      heat the disk by applying a heating power to the heater for a time interval;
      reduce the heating power after the time interval; and
      write the spiral servo tracks to the disk after the time interval.

11. The apparatus as recited in claim 10, wherein the heater comprises a lamp.

12. The apparatus as recited in claim 11, wherein the lamp comprises a halogen lamp.

13. The apparatus as recited in claim 12, wherein the halogen lamp comprises a reflector.

14. The apparatus as recited in claim 10, wherein reducing the heating power comprises turning the heating power off.

15. The apparatus as recited in claim 10, further comprising a nest for receiving a head disk assembly (HDA) housing the disk.

16. The apparatus as recited in claim 15, wherein heating the disk comprises heating the HDA.

17. The apparatus as recited in claim 15, wherein heating the disk comprises radiating energy onto an external surface of the HDA.

18. The apparatus as recited in claim 15, wherein the control circuitry is further operable to adjust the time interval based on a number of disks housed in the HDA.

19. The apparatus as recited in claim 15, wherein the control circuitry is further operable to adjust the time interval based on a size of the disk.

* * * * *